Sept. 19, 1972 G. H. JOHNSON 3,692,735
INORGANIC LITHIUM-CHROME-SILICATE PIGMENTS
Filed Aug. 15, 1969
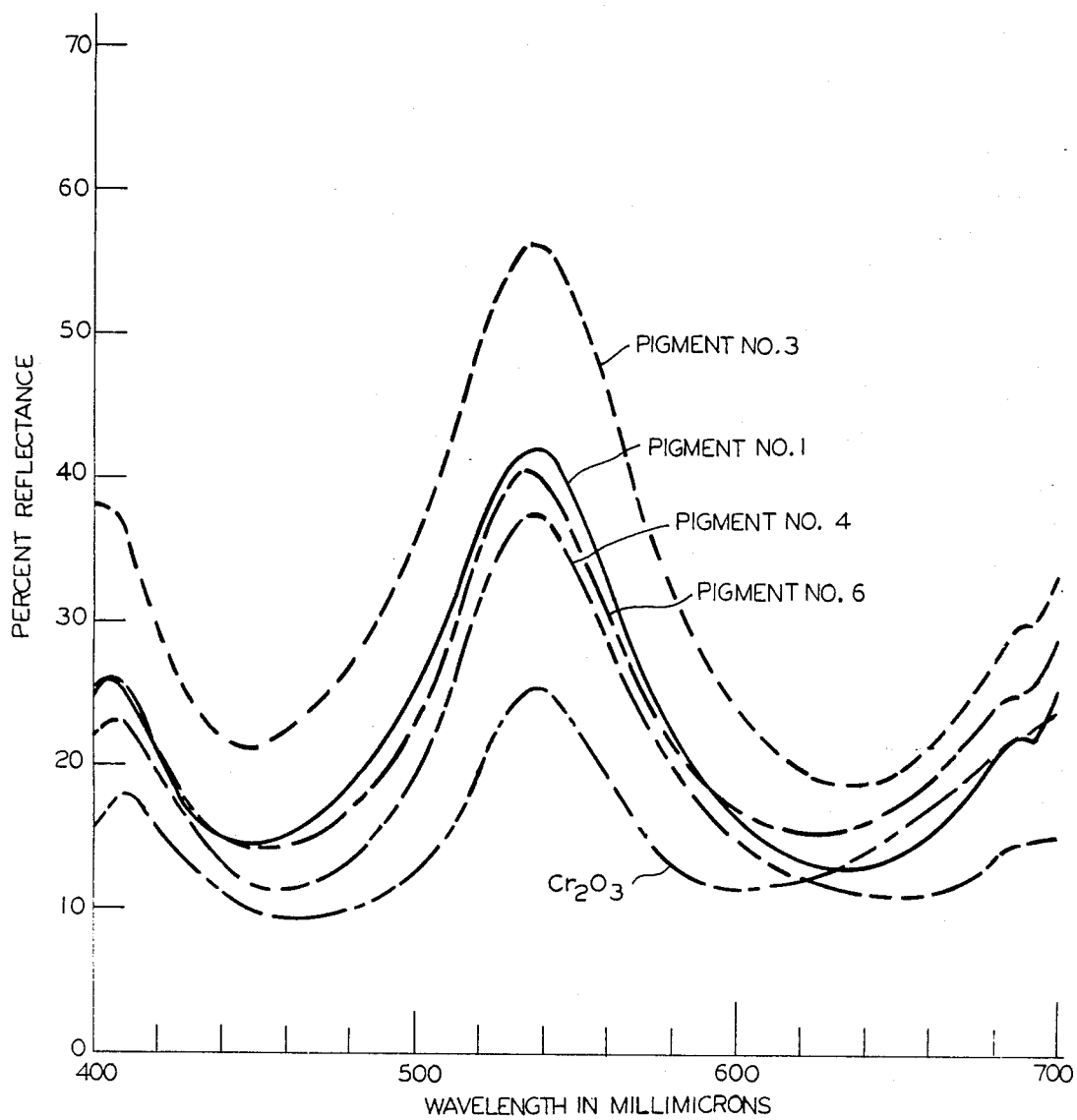
INVENTOR
GORDON H. JOHNSON
BY
ATTORNEY

United States Patent Office

3,692,735
Patented Sept. 19, 1972

3,692,735
INORGANIC LITHIUM-CHROME-SILICATE PIGMENTS
Gordon H. Johnson, Olmsted Falls, Ohio, assignor to Ferro Corporation, Cleveland, Ohio
Continuation-in-part of application Ser. No. 645,353, June 12, 1967. This application Aug. 15, 1969, Ser. No. 850,610
Int. Cl. C08f *45/04;* C08g *51/04;* C09c *1/34*
U.S. Cl. 260—41                     25 Claims

ABSTRACT OF THE DISCLOSURE

This invention relates to inorganic green lithium chrome silicate pigments of the formula $RCr(SiO_3)_2$ wherein R is sodium, lithium and/or any mixture of sodium and lithium adding up to the stoichiometric equivalent of one molar equivalent of R. These compositions may also include mixtures of a compound such as defined above, with one or more of the polymorphic forms of silica. These compounds are prepared by calcining an admixture of a sodium compound and/or a lithium compound with a chromium compound and a silicon compound.

---

This application is a continuation-in-part application of Ser. No. 645,353, filed June 12, 1967, now abandoned.

It has been found that a very desirable and superior green pigment, useful in coloring numerous articles such as paints, plastics and the like, can be produced by calcining together an intimate admixture of the oxides of sodium or lithium with chromium and silicon compounds. As used herein, sodium, lithium, chromium, and/or silicon oxides are to be understood to include oxide producing compounds of the respective elements unless the context clearly indicates otherwise, such as in specific examples, etc. It will be further understood that where oxide producing compounds of sodium, lithium, chromium or silicon are used in place of the respective oxides, whether for all or only part of that oxide, the stoichiometric equivalent of the particular oxide will be employed.

Phthalocyanine pigments are commonly used in plastics to produce colors in the blue-green hue area, and very small amounts, usually coupled with larger amounts of titanium dioxide, are sufficient to produce colors with a high degree of purity and brightness. Because of their great tinting strength and their poor dispersing qualities, however serious problems have been encountered in color matching, and color uniformity. Although these pigments have adequate heat and light stability to be used in most of the present resins, many exceptions do exist such as, for example, some silicone type resin systems. Resins with molding temperatures, far in excess of those at which these known pigments degrade, are not only contemplated, but are even now commercially available.

In general, the objectives of the present invention can be broadly outlined as the discovery of novel compositions of matter and the development of green inorganic pigments which have a practical ability to resist degradation by heat, light and other typical adverse environments or conditions, and which allow the production of plastic materials whose color is superior in purity or brightness to that produced by any present commercial inorganic pigment. The specific objects will be set forth in more detail hereinafter.

The novel lithium containing pigments of the present invention are produced by intimately admixing lithium oxide equivalent to from 3 to 15 percent by weight of the finished pigment, with chromium oxide equivalent to from 15 to 60 percent by weight of the finished pigment, and a silicon oxide equivalent to from about 30 to about 80 percent by weight of the finished pigment, then calcining the admixture at a temperature from about 800° C. to about 1500° C. for from about 2 hours to about 16 hours to produce the desired pigment, the preferred range of oxides of lithium, chromium and silicon being 3 to 12; 20 to 55; and 35 to 75 percent by weight respectively.

The novel sodium containing pigments of the present invention are produced by intimately admixing sodium oxide equivalent to from 5 to 20 percent by weight of the finished pigment, with chromium oxide equivalent from 20 to 50 percent by weight of the finished pigment, and a silicon oxide equivalent to from about 35 to 70 percent by weight of the finished pigment, then calcining the admixture at a temperature of from about 800° C. to about 1500° C. for from about 2 hours to about 16 hours to produce the desired pigments, the preferred ranges of the oxides of sodium, chromium and silicon being 5 to 15; 25 to 45 and 40 to 65 percent by weight respectively.

When a mixture of alkali metal oxides are employed the pigments are produced by intimately admixing alkali metal oxides equivalent to from 3 to 20 percent by weight of the finished pigment, with chromium oxide equivalent to from 15 to 60 parts by weight of the finished pigment, and a silicon oxide equivalent to from about 30 to 80 percent by weight of the finished pigment, then calcining the admixture at a temperature of from about 800° C. to about 1500° C. for from about 2 hours to about 16 hours to produce the desired pigments, the preferred ranges of the oxides of alkali metals, chromium and silicon being 3 to 15, 20 to 55 and 35 to 75 percent by weight respectively. It should of course be noted that where a mixture of alkali metal oxides are employed substitutions of one alkali metal for another should be done on a molar basis and not on a weight percent basis.

It will of course be obvious to those skilled in the art that the foregoing times and temperatures are those which were found to be most practical in preparing the novel pigments of the present invention under the conditions then prevailing and with the laboratory equipment then in use. It is well known in the art of calcining inorganic pigments that calcination must be carried out for a sufficient length of time, depending upon the size of the batch, the degree of fineness, the capacity of the furnace, etc., to produce the required shade, and that time and temperature may be varied over wide ranges in producing a given level of heat treatment in a calcination process. Thus, while the preferred heating cycle is from about 2 to about 16 hours at a temperature of from about 800° C. to about 1200° C., it is possible to produce a useful pigment where the heating cycle is 1 hour or even less than 1 hour at some higher temperature; and/or for some period of time even in excess of 16 hours, at a temperature only slightly higher than the highest decomposition temperature of the particular oxide yielding substances being used.

When the calcination cycle has been completed and the calcined batch cooled, the pigment may be placed in a condition for incorporation as a coloring pigment into paints, plastics and the like, be any of a number of known methods of pigment finishing. As one example of such a procedure, mention might be made of the method comprising the steps of crushing the cooled pigment, milling it to extremely fine particle size in a suitable medium in which the pigment is insoluble, such as acetone, following which the pigment can be dried and micropulverized.

It is one object of this invention to provide a green pigment composition comprising the oxides of sodium or lithium, chromium and silicon.

It is another object of this invention to provide certain novel compositions of matter.

It is still a further object of this invention to provide a method for imparting a green color to articles of manufacture.

It is yet another object of this invention to provide a method of manufacturing green pigment comprising the oxides of sodium or lithium, chromium and silicon.

Other objects, features and advantages of the present invention will in part be obvious and will in part be found in the following description taken in conjunction with the accompanying drawing wherein FIG. 1 illustrates spectrophotometer curves of some of the novel pigments of the present invention.

The pigments of the present invention have a cleaner color and more pleasing hue than green inorganic pigments used heretofore, and are therefore considered to be a decided advance in the art. In addition, they exhibit no bleeding or exudation from plastic resins into which they are incorporated, a great advantage over many pigments heretofore employed in coloring in plastic resins. More importantly, they exhibit improved ability to resist degradation due to heat, light and other adverse environments or conditions.

The desirable pre-calcination components of the pigments of this invention are various compounds of chromium, silicon, sodium and lithium such as the carbonate of sodium and lithium and the naturally occuring oxides of silicon and chromium, lithium chromate, lithium silicate, sodium chromate, sodium silicate, lithium oxide, sodium oxide, etc.

While these compounds were found most convenient for use in experiments, it is of course possible to use any compound of any one of the elements chromium, sodium, lithium and silicon capable of yielding its respective required oxide equivalent upon calcination. Thus, the carbonates, chromates and silicates giving up their volatile components upon sintering in an oxidizing atmosphere are available at some time during sintering for whatever co-acting phenomenon takes place to create the pigments of this invention. It is also well known that nitrates of lithium and sodium and ammonium compounds of chromium and silicon are practical means for introducing their respective oxide equivalents.

So far as the preliminary preparation of the starting compounds is concerned, any conventional method of milling them into a fine powder form for intimate mixing prior to calcination may be employed, such methods being well known in the art.

After thoroughly mixing, the tricomponent system is calcined in conventional saggers in a suitable furnace, in a non-reducing atmosphere for the required time and temperature as indicated in the examples set forth below. After calcining, the pigment is cooled to room temperature and may again be milled in a suitable medium, in which the finished pigment is not soluble, followed by drying and micropulverization; or the pigment may be taken directly from the calcining operation and micropulverized. The milling and micropulverizing procedures may be carried out one or more times. Following the final micropulverization, the pigment is then ready for incorporation into various materials as hereinafter described.

By way of demonstration, but not by limitation, the following tables comprise a list of materials and conditions for preparing typical compositions within the scope of the present invention. The materials, conditions and compositions in the tables are illustrative of only a few of the innumerable variations possible, without departing from the principle and/or scope of the present invention.

Table I below illustrates a series of batch compositions which were calcined according to the foregoing general procedure, departures from the general procedures such as calcination temperature, calcination time, etc., being set forth in subsequent Table II. In each pigment in Table I, the raw batch (precalcination) components for incorporation of chromium, lithium or sodium and silicon are respectively the carbonate of sodium and lithium, and the oxides of chromium and silicon.

TABLE I

| Composition | 1 | 2 | 3 | 4 | 5 | 6 | 7 |
|---|---|---|---|---|---|---|---|
| Weight percent: | | | | | | | |
| $Li_2CO_3$ | 15.93 | 21.58 | 10.58 | | | 12.50 | 2.91 |
| $Na_2CO_3$ | | | | 21.05 | 17.16 | 4.53 | 17.30 |
| $Cr_2O_3$ | 32.58 | 43.78 | 21.49 | 30.85 | 24.58 | 32.16 | 30.87 |
| $SiO_2$ | 51.49 | 34.64 | 67.93 | 48.09 | 58.26 | 50.82 | 48.91 |

Table II below corresponds, as will be seen, to Table I in that the compositions of Table II are set forth in the same order showing the calculated oxide composition of the respective batches set forth in Table I, calcination temperature, the total calcination time in hours and the color of the final, micropulverized pigment.

TABLE II
[Calculated $Li_2O \cdot Cr_2O_3 \cdot SiO_2$ and $Na_2O \cdot Cr_2O_3 \cdot SiO_2$ compositions]

| Composition | 1 | 2 | 3 | 4 | 5 | 6 | 7 |
|---|---|---|---|---|---|---|---|
| Weight percent: | | | | | | | |
| $Li_2O$ | 7.08 | 9.89 | 4.51 | | | 5.58 | 1.33 |
| $Na_2O$ | | | | 13.6 | 10.79 | 2.89 | 11.07 |
| $Cr_2O_3$ | 36.00 | 50.32 | 22.94 | 33.5 | 26.46 | 35.46 | 33.04 |
| $SiO_2$ | 56.92 | 39.78 | 72.55 | 52.9 | 62.75 | 56.07 | 53.66 |
| Calcining temperature °C | 1,200 | 1,100 | 1,200 | 1,000 | 1,100 | 1,150 | 1,000 |
| Calcining time- hours | 4 | 4 | 4 | 4 | 4 | 4 | 4 |
| Calcined pigment color | Green | Green | Green | Green | Green | Green | Green |

All of the various compositions, 1 through 7 of Table II, were found to contain a compound of the formula:

(I)  $RCr(SiO_3)_2$ wherein R is sodium, lithium or mixtures of sodium and lithium. Examination of sodium and lithium samples showed that, surprisingly, the respective compounds were isostructural, that is to day, they had the same crystalline structure. This is very unexpected since in the preparation of calcined pigments or compositions such as those of the present invention crystal chemical properties rather than common chemical properties determine the similarity of different compounds and crystal chemically lithium and sodium are quite different. Even more surprisingly it was found that where mixtures of sodium and lithium were employed a complete series of solid solutions were formed without regard to the ratio of sodium to lithium. Thus, so long as the molar quantity of sodium and the molar equivalent of lithium added up to the desired molar quantity of R in formula above a solid solution conforming to Formula I was formed.

All of the various compositions of Table II were found to contain a novel compound within the scope of Formula I set forth above either alone or together with one or more of the polymorphic forms of silica.

It is well known in the art of preparing calcined compositions of matter that certain crystal chemically similar materials can be substituted for all or part of a particular composition. This has nothing to do with the comparative chemical properties of the various materials, but rather a matching of crystal chemical properties such as crystal size and electrical charge, etc. Thus, it is well known that great difficulty usually attaches to any attempt to substitute one alkali metal for another in calcined ternary compounds such as those of the Formula I. For example, attempts to make an alkali cobalt phosphate inorganic pigment, such as those disclosed in U.S. application, Ser. No. 344,363, filed Feb. 12, 1964, U.S. application Ser. No. 583,316, filed Sept. 30, 1966, and U.S. application Ser. No. 583,268, filed Sept. 30, 1966, clearly show that where lithium, sodium and/or potassium are calcined together with cobalt oxide and phosphorous oxide isostructural compositions are not obtained, and in fact, a widely differing group of compounds were obtained for each of the three systems. The second of the above-noted applications, Ser. No. 583,316, which discloses and claims certain potassium oxide, cobalt oxide, phosphorus oxide, inorganic pigments, clearly states that in partial substitutions of one alkali for another only 10% of the potassium oxide can be successfully replaced by lithium oxide without causing a major change in the crystalline structure.

Also, very surprisingly, the color obtained by the use of the novel pigments of the present invention is not the normal green color of chromium oxide which might be expected, but a very unexpected and much more pleasant and useful green color. This color is quite clean, clear, and sharp; heat stable at very high temperatures; and it mixes readily with a large number of blue-green colors. FIG. 1 is a graph of the spectrophotometer curve of four of the novel pigments of the present invention and, for purposes of comparison, the corresponding curve for $Cr_2O_3$ pigment. An examination of FIG. 1 readily illustrates the much brighter and cleaner green color produced by the pigments of the present invention when compared with green colors produced by $Cr_2O_3$, particularly in that portion of the curve from 500 to 600 $\mu$.

A series of X-ray diffraction examinations were performed on the various compositions of Table II. In every instance X-ray diffraction analysis revealed the presence of a ternary composition within the scope of Formula I. The results of these X-ray diffraction examinations are set forth in Table III.

TABLE III.—X-RAY DIFFRACTIONS

| Pigment Number [1] | | | | | | | | | | | | | | |
|---|---|---|---|---|---|---|---|---|---|---|---|---|---|
| 1 | | 2 | | 3 | | 4 | | 5 | | 6 | | 7 | |
| d | I/I₀ | d | I/I₀ | d | I/I₀ | d | I/I₀ | d | I/I₀ | d | I/I₀ | d | I/I₀ |
| | | | | | | 6.24 | 40 | 6.28 | 87 | | | 6.29 | 100 |
| 6.18 | 45 | 6.19 | 43 | 6.19 | 50 | | | | | 6.20 | 75 | | |
| | | 4.80 | M | | | | | | | | | | |
| 4.39 | 25 | 4.39 | 28 | 4.40 | 30 | 4.35 | 33 | | | 4.36 | 25 | 4.35 | 59 |
| | | | | | | | | 4.34 | 8 | | | | |
| 4.28 | 50 | 4.29 | 36 | 4.29 | 50 | | | | | 4.29 | 62 | | |
| | | | | | | | | 4.09 | 8 | | | | |
| | | | | 4.04 | 8 | 4.05 | VVW | 4.04 | VW | | | | |
| | | | | | | | | 3.80 | M | | | | |
| 3.48 | 33 | 3.48 | 21 | 3.48 | 35 | | | | | 3.50 | 25 | 3.50 | 6 |
| 3.23 | 7 | 3.23 | 7 | 3.24 | 5 | | | | | 3.24 | 6 | 3.29 | 6 |
| | | | | | | 3.14 | 7 | 3.14 | 13 | | | 3.14 | 6 |
| 2.951 | 100 | 2.957 | 100 | 2.957 | 100 | 2.953 | 100 | 2.955 | 100 | 2.961 | 100 | 2.962 | 94 |
| | | | | | | 2.864 | 73 | 2.864 | 93 | | | 2.864 | 100 |
| 2.817 | 70 | 2.822 | 65 | 2.824 | 65 | | | | | 2.829 | 81 | | |
| 2.720 | 7 | | | 2.728 | 5 | | | | | 2.728 | 12 | | |
| 2.494 | 17 | 2.499 | 14 | 2.497 | 25 | 2.506 | 40 | 2.513 | 33 | 2.499 | 19 | 2.518 | 29 |
| 2.464 | 27 | 2.467 | 50 | 2.466 | 40 | | | | | 2.478 | 31 | | |
| | | | | | | 2.440 | 33 | 2.444 | 23 | | | 2.440 | 35 |
| 2.380 | 22 | 2.384 | 21 | 2.384 | 20 | | | | | 2.393 | 25 | 2.390 | 6 |
| | | | | | | 2.229 | 7 | 2.233 | 7 | | | 2.223 | 5 |
| | | | | | | 2.174 | 20 | 2.174 | 20 | | | 2.177 | 12 |
| 2.125 | 15 | 2.127 | 14 | 2.127 | 15 | | | | | 2.137 | 12 | | |
| 2.088 | 15 | 2.090 | 14 | 2.090 | 15 | 2.094 | 20 | 2.097 | 20 | 2.092 | 12 | 2.097 | 24 |
| | | | | | | 2.070 | 13 | 2.074 | 13 | | | 2.077 | 12 |
| | | 2.060 | M | | | | | | | | | | |
| 2.039 | 5 | | | | | | | | | 2.043 | 6 | 2.032 | 6 |
| | | | | | | 2.013 | 7 | 2.017 | 7 | | | | |
| | | | | | | 1.992 | 7 | 1.994 | 7 | | | 1.994 | 6 |
| 1.906 | 22 | 1.901 | 21 | 1.901 | 15 | 1.912 | 7 | 1.912 | 7 | 1.903 | 19 | 1.914 | 12 |
| 1.861 | 5 | | | 1.861 | 5 | | | | | 1.864 | 6 | | |
| | | | | | | 1.708 | 13 | 1.709 | 7 | | | 1.708 | 12 |
| 1.684 | 12 | | | 1.688 | 5 | | | | | 1.689 | 6 | | |
| | | | | | | 1.668 | 20 | 1.671 | 20 | | | 1.671 | 6 |
| | | | | | | 1.641 | 7 | | | | | 1.641 | 5 |
| 1.617 | 22 | 1.617 | 21 | 1.619 | 25 | 1.622 | 7 | | | 1.625 | 12 | 1.626 | 5 |
| 1.585 | 20 | 1.587 | 28 | 1.587 | 15 | | | | | 1.589 | 12 | 1.595 | 18 |
| | | | | | | 1.574 | 7 | 1.574 | 7 | | | 1.572 | 6 |
| | | | | 1.550 | W | | | | | 1.553 | W | | |
| | | | | | | 1.518 | 7 | 1.520 | 7 | | | 1.518 | 5 |
| | | | | | | 1.491 | 7 | 1.510 | 7 | | | 1.493 | 5 |
| | | 1.465 | W | | | | | | | | | | |
| | | 1.453 | W | | | | | | | | | | |
| 1.430 | 12 | 1.430 | 7 | 1.432 | 10 | | | 1.439 | 7 | 1.432 | 6 | 1.430 | 6 |
| | | 1.388 | W | | | 1.390 | 7 | 1.389 | 7 | | | 1.390 | 6 |
| 1.382 | 7 | | | 1.384 | 5 | | | | | 1.385 | 6 | | |
| | | | | | | 1.380 | 13 | 1.380 | 13 | | | 1.376 | 12 |
| 1.346 | 15 | 1.347 | 14 | 1.348 | 15 | | | | | 1.351 | 12 | | |

[1] Corresponds to pigment numbers of Table II.

Note:
d = Interplanar distance.
I/I₀ = Relative intensity—Numerical values denoting lines of the compounds defined by Formula I, and letter values denoting lines indicating the presence of other phase(s), for example one or more forms of $SiO_2$.

The following specific examples will describe in more detail the synthesis of the novel pigments and compositions of the present invention and the incorporation of these novel pigments into various paint and polymer compositions. These examples are offered by way of illustration and not by way of limitation.

EXAMPLE I $Li_2O \cdot Cr_2O_3 \cdot 4SiO_2$ (Pigment No. 1 of Table II) was prepared from 1.76 grams of lithium carbonate, 3.60 grams of chromium oxide ($Cr_2O_3$) and 5.69 grams of silica ($SiO_2$). All materials were separately ground in standard laboratory dry ball mill apparatus to pass through a 100 mesh screen. The weighed reagents were placed in a small jar containing small plastic balls and the jar was placed in a conventional paint shaker and shaken for 10 min., after which the mixed powder was removed from the jar and placed in a standard fire clay crucible and the calcining was carried out in a muffle-type electric furnace at 1200° C. for a period of 4 hours. After calcining and cooling, a green pigment was obtained and upon X-ray diffraction analysis this pigment was confirmed as being a single phase with the structure

$Li_2O \cdot Cr_2O_3 \cdot 4SiO_2$

EXAMPLE II $Na_2O \cdot Cr_2O_3 \cdot 4SiO_2$ (Pigment No. 4 of Table II) was prepared from 2.32 grams of $Na_2CO_3$, 3.4 grams of $Cr_2O_3$ and 5.3 grams of $SiO_2$ using the procedure set forth in Example I. After calcining and cooling a green colored pigment was obtained and when this pigment was subjected to X-ray diffraction analysis it was confirmed to be a single phase having the formula $Na_2O \cdot Cr_2O_3 \cdot 4(SiO_2)$ The other novel pigments of Tables I and II were also subjected to X-ray diffraction analysis. The analysis showed that the pigments are composed of one or more ionically bonded phases of the novel composition of matter within the scope of Formula I either alone or with one or more polymorphic forms of silica.

EXAMPLE III

A potassium oxide yielding substance, a chromium oxide yielding substance and silica, in the molar ratio of 1:1:4 (the same molar ratio of alkali metal to chrome oxide to silica as in Example I, II) were calcined according to the procedure set forth in Example I. 2.85 grams of $K_2CO_3$, 3.12 grams of $Cr_2O_3$, and 4.94 grams of $SiO_2$ were calcined at 1200° F. for ½ hour (at which time the sample appeared to be overfired). After cooling the sample was examined and found to be an inhomogeneous mixture of binary compounds of potassium, silica, chrome oxide, and hexavalent chrome compounds. The sample had a mottled appearance, and was an inhomogeneous reddish yellow color which appeared olive drab after grinding, and when washed with water the olive drab color changed to the typical chrome oxide ($Cr_2O_3$) green color and the color of the water indicated appreciable quantities of hexavalent chromium. X-ray diffractions of the unwashed sample indicated the presence of a tridymite ($SiO_2$) phase, a cristobaitite ($SiO_2$) phase, a $Cr_2O_3$ phase, and an unidentified phase which was not present after washing with water. Further X-ray analysis failed to positively identify the unidentified phase, however we were able to eliminate any possibility that the phase might contain a ternary potassium chrome silica compound.

EXAMPLE IV

Further attempts were made to produce a ternary potassium, chrome silica compound analagous to the sodium and/or lithium compounds of Table II. In these experiments the procedure of Example III was generally followed but calcining temperatures and times were varied, and the ratio of $K_2O$ to $Cr_2O_3$ to $SiO_2$ was changed from the 1:1:4 ratio of Example III, to various other ratios including 1:1:1, 1:1:2, and 1:1:6. All of the samples produced in these experiments were substantially the same as that produced in Example III with an inhomogeneous mottled reddish yellow color which, on X-ray diffraction showed only binary compounds, showing a tridymite phase, a cristobaitite phase, a $Cr_2O_3$ phase, and an unidentified phase. Again the unidentified phase was established to be something other than a ternary compound, and was missing on X-ray diffraction of samples which had been washed with water.

Each of the novel pigments of Table II was dispersed in polyvinyl alcohol in order to form standard color test chips. The test formulation and the test procedure for each of the 7 samples was exactly the same, 10 ml. dry volume of the pigment was dispersed in 10 ml. of an 8% water solution of polyvinyl alcohol and a 3 mil thickness film was cast on a split black and white card, the suspension liberally covering both portions, and allowed to dry. The polyvinyl alcohol film in every case displayed a tone and color quite similar to the respective pigment with which each sample was tinted, when viewed over the white portion of the card, and fair to good covering power when viewed over the black portion of the card. FIG. 1 depicts representative spectrophotometer curves of certain pigments, viewed over the white portion of the card. As seen in FIG. 1 the pigments are numbers 1, 3, 4 and 6 of Table II. As previously noted the corresponding spectrophotometer curve for $Cr_2O_3$ is also shown in FIG. 1, for purposes of comparison.

Because of the large number of pigments and because all the pigments exhibited uniform properties when dispersed in polyvinyl alcohol films, further experiments were carried on with the two basic pigment compositions, pigments 1 and 4. Each of the pigments was also incorporated in various thermoplastic resins, according to the following procedure: to 100 grams of resin, 2 grams of pigment was added and the mix placed into a quart jar and shaken for one minute in a conventional paint shaker. The dry pigment-resin blend was then put through a laboratory injection molder (Van Dorn Model H-200) at the optional molding temperature of each resin, and pressed into a cavity to form chips approximately 1¾ x 2¼ inches in size, each chip having a segment, respectively, 0.05, 0.1 and 0.15 inch thick. The only exception to this procedure was in the case of high density polyethylene in which 0.2 gram of wetting agent were mixed with the resin on a paint shaker for a period of 10 minutes before the addition of the pigment and/or the pigment and the titanium dioxide. Again, in every case, the pigment-plastic resin dispersion was essentially the same color as the pigment and in every case, the pigment imparted the same correspondingly pleasant shade to the thermoplastic resin as exhibited by the pigment itself.

The resins used in this series of examples were Alaton No. 14, a polyethylene resin manufactured by E. I. du Pont de Nemours and Company, Inc. of Wilmington, Del., having those properties set forth in Bulletin A-27266, Aug. 22, 1962, published by the manufacturer; Marlex No. 6060 high density polyethylene manufactured by the Phillips Chemical Company of Bartlesville, Okla. having those properties as set forth in the Phillips Technical Information Bulletin dealing with Marlex plastics as revised July 1960; Styron No. 475 high impact polystyrene manufactured by the Dow Chemical Company, Plastics Department, Midland, Mich., having the properties described in the technical bulletin published by Dow Chemical Company, No. 171-138A; Lestrex No. HF-77 polystyrene manufactured by the Monsanto Chemical Co., Plastics Division, St. Louis 66, Mo., having the properties as set forth on page 6 of the Monsanto date section occurring between pages 304 and 317 of the 1962 edition of Modern Plastics Encyclopedia; Profax type 6513 polypropylene manufactured by the Hercules Powder Company of Wilmington, Del., having the properties described in the Manufacturer's Bulletin Form 500-41 10M 11-63 8105.

In order to check the tinting strength of the pigments 1 and 4 of Table II, a series of tests involving all the previously listed thermoplastic resins was run identically to the tests described above involving thermoplastic resins, except the mix was 100 grams of resin, 1 gram of pigment, and 1 gram of Titanox RA titanium dioxide, which is essentially a pigment grade titanium dioxide, very finely milled and intended to impart a degree of opacity to the test chip to produce a pastel shade of each pigment. Injection molding of each pigmented resin system was carried out precisely as described above, and it was observed that the pigment in its respective pastel chip thus produced, retained its original hue quite well.

To demonstrate the adaptability of the pigments of this invention to thermosetting resin systems, the basic formulations according to Table V below were compounded.

TABLE V

|  | Parts by weight | | | |
| --- | --- | --- | --- | --- |
|  | A | B | C | D |
| Polyester 249 | 85 | 80 | 80 | 75 |
| Filler (CaCo₃) | 10 | 10 | 10 | 10 |
| Silica-gel | 1 | 1 | 1 | 1 |
| Titanox RA |  |  |  |  |
| Pigment number 1 or 4, Table II | 5 | 10 | 5 | 10 |

249 polyester is manufactured by Reichold Chemical Company and is a medium reactive (resilent maleic anhydride, isophthalic, polyester resin consisting of about 65% of the foregoing polyester dissolved in styrene monomer.

Titanox RA is a finely ground titanium dioxide manufactured by the Titanium Pigment Corporation.

In each case, the foregoing thermosetting systems were set at room temperature with cobalt-naphthenate and methyl-ethyl-ketone-peroxide in one series, and at 200° F. with benzoyl-peroxide in another series, these techniques being standard and well known in the art.

Each test was made by pouring the pigmented composition into a cylindrical mold and setting the resin in the form of a disc-shaped test piece. In each example, a very pleasant green shade was achieved corresponding to the pigment prior to incorporation into the resin and it was observed that the pleasant green shade thus achieved had never been possible prior to this invention with basically inorganic pigments such as the one of this invention.

In order to evaluate the heat stability of these pigments, pigments 1 and 4 were compounded as set forth above in combination with thermoplastic resins (but without any $TiO_2$), for injection molding by a single pass through the cylinder at the normal molding temperatures of 500° F. for polystyrene and linear polyethylene, 450° F. for high impact polystyrene and polyethylene and 525° F. for polypropylene. Another complete set of test chips utilizing pigments 1 and 4 of Table II were then molded by the same procedures except retaining the pigmented plastic for 5 minutes in the cylinder at the normal molding temperature before casting in order to subject the pigments to above normal heat treatment. A comparison of the chips made following conventional procedures with those produced by extended heating at 5 minutes in the cylinder revealed no substantial difference between the pigmented chips produced by normal methods and those subjected to the abnormal heat treatment.

A series of chips were then made according to the foregoing procedures with the five thermoplastic resins as well as the thermosetting polyester, all colored with pigments 1 and 4 of Table II as outlined above, and were exposed to the rays of a twin arc Model OMC-H Atlas Weather-O-Meter by using cam #102–18 (light 102 minutes, light+ water 18 minutes) and a black body temperature range of 90° F. for a total of 500 hours.

Visual inspection of the exposed and the unexposed samples revealed an excellent light stability of the pigment and a slight color change from light green to yellowish-green was attributed to the yellowing of the resins and not to the fading of the pigment.

Unexposed samples of the weathering tests were immersed in 3% and 30% $H_2SO_4$ water solutions and in 1% and 10% NaOH water solutions for 48 hours. No change in color or surface was visible, indicating a high degree of resistance in these pigments to acid and alkali attack.

To confirm that the beneficial results of this invention are possible with a wider sampling of the pigments listed in Table I, pigments were run in polypropylene Profax 6511–J in accordance with the above described procedures for thermoplastic resins, both with and without the opacifier ($TiO_2$). As polypropylene has the highest molding temperature it was felt the pigments thereby underwent the most severe heat treatment. In every case, the color imparted to polypropylene was much the same as that of the pigment itself, with no discernible ill effects from the heat of processing.

In all of the tests hereinbefore described the novel pigments of the present invention compared very favorably with $Cr_2O_3$ pigmented compositions, and in many instances were felt to be superior to phthalocyanine pigmented compositions.

It will, of course, be readily apparent to those skilled in the art that the foregoing examples of the incorporation of the novel pigments of the present invention into various plastic resins and plastic compositions are merely by way of illustration and in no way by way of limitation, and that equivalent results would be obtained with a number of other plastic resins and/or similar resins from a different supplier, with different additives to the formulation such as plasticizers, stabilizers and fillers, etc., and/or under different conditions of time and temperature and procedure for mixing, molding and/or curing the mixed plastic formula.

It is possible without departing from the scope of the present invention to substitute other materials for a portion of one or more of the starting materials of the present invention in order to effect a wide variety of predetermined special end results, such as, for example, reduction in cost, a slight shift in the coloring in one direction or another, to produce a more pastel shade of certain of these colors, etc. In making such substitutions, as previously noted, the critical factor is not a matching of so-called well known chemical properties, e.g., substituting one halide for another, but rather a matching of the crystal properties such as crystal size and electrical charge, etc.

It has often been said that lithium or sodium oxides and potassium are equivalent materials for most uses. This is at best only partly true, and in the present case it is not true at all, because, as noted above, in the present invention substitution is far more dependent on crystal structure and crystal properties than on so-called well known chemical properties. The results obtained in Examples III and IV clearly prove that one alkali metal is not the equivalent of another for purposes of this invention. In this regard it is well known that sodium and lithium are significantly different in crystal size, etc., from each other but even more notably different from potassium. In view of the well known teachings of the art however, it is still more of an unexpected result to find that isostructural compositions are obtained when sodium and lithium are used interchangeably according to the teachings of the present invention to the exclusion of potassium. Also in making other substitutions in pigments of the present invention it was found, for example, that a small percentage of a mixture of molar equivalent of calcium and cobalt could be substituted for an equimolar quantity of lithium and chromium to provide a bluer pigment.

It should be noted that, at least in general, the upper limit of the concentration of any given substitute is a function of the similarity of its crystal properties and the crystal properties of the material which it partially replaces. This upper limit, however, pertains only to substitution without changing the basic structure of the crystal lattice of the calcined pigment, and it should be obvious that in many cases a concentration far below such an upper limit will result in objectionable changes in color.

As will be readily apparent from the foregoing specific working examples, the pigments of this invention, although inorganic, do not possess the necessary chemical structure for extremely high temperature applications such as for ceramic glazes, ceramic bodies or porcelain enamels, or as a tinting component dispersed in metals. However, for relatively low temperature applications, below 1000° F., they have extremely good chemical, heat and light stability.

In order to confirm the universal applicability inherent in the pigments of this invention for relatively low temperature use, one of the pigments of this invention, represented by the molecular composition $NaCr(SiO_3)_2$, was incorporated in various percentages in various polymers and copolymers including acetal, acrylic and butyrate copolymers; nylon, acrylonitrile, butadiene styrene, polycarbonate and melamine, all with the same outstanding results as achieved in the foregoing specific working examples.

The pigment was also utilized to successfully color epoxy based offset ink, a silicone resin, an acrylic-vinyl latex water based paint, a soya-alkyd oil based paint, and an epoxy-alkyd type thermofluid printing composition for glassware, of the general type exemplified by U.S. Pats. 2,950,209 and 2,823,138.

In like manner, the pigment of this invention, because of its stable, non-reactive character at relatively low temperatures, makes an excellent coloring dispersion for paper, and paper products such as cardboards, as well as for plaster, plasterboard, cement, mortar and concrete.

Summarizing the scope of applicability of the pigments of this invention, they have utility as a coloring pigment for any product which, during that phase of its processing involving dispersion therein of the pigment of this invention, is not subjected to operating temperatures higher than 1000° F. and which are not designed for end use under conditions which would subject the pigmented article to temperatures in excess of 1000° F.

The only other limitation upon items which can be effectively colored by the pigment of this invention would be extremely acid or basic items, the preferable pH range being from about 4.0 to about 9.0, with items having a pH lower than 2.0 or greater than 11.0 having an acidity or basically considered too extreme for optimum pigmenting with the pigment of this invention.

The items herein discussed which may be colored with the pigment of this invention are defined broadly as "work products," and include any and all items enumerated above and any items which are essentially non-metallic having a pH of preferably from 4.0 to 9.0, exclusive of any items having a pH less than 2.0 or greater than 11.0, which are processed during or after dispersion therein of the pigment of this invention at temperatures 1000° F. or less, and which are not adapted for subsequent end use whereby they are subject to temperatures in excess of 1000° F.

Exemplary of such work products as defined above, but in no way to be considered a specific limitation thereto, are all manner of paints, lacquers and varnishes, and generally any composition adaptable to be colored by a pigment dispersed therein, and to be applied to a substrate to form a relatively thin, closely adherent coating thereto. "Paint" also to be construed to include printing inks, vehicles and pastes for decorating any suitable substrate such as glass, metal, cloth, paper, sheeting, etc.

Work product is also construed to include within its scope all manner of polymers and copolymers generally designated as snythetic resins and exemplified by the specific working examples and disclosure set forth above, including, but not limited to, such polymers and/or copolymers disclosed in U.S. Pats. 2,985,617 to Salyer et al., and 3,328,334 to Charles H. Fuschsman, and patents referred to therein.

Work product is further construed to include within its scope, paper, cardboard, and paper products generally, plaster, plaster of paris, cement, concrete, mortar and plasterboard.

As is well known in the art, the concentration of pigment in any product to be colored is a matter of wide choice, depending upon the desired end result; and concentration, as such, is not critical to this invention. As with all such operations however, economic considerations, if nothing else, will militate against anyone going to absurb lengths to overload a product to be colored, with the pigment of this invention.

Hence, as used herein, such words or phrases as "dispersed," "pigment dispersion," "colored with . . . pigment" are intended to indicate conventional, common sense concentrations, widely variable, to provide any given coloring effect, without materially, adversely affecting the utility and end use properties of the work product colored by the pigment of this invention.

It will further be apparent that certain well known extenders, pigments, fillers, or whitening agents, etc., may be incorporated into the novel pigments of the present invention without departing from the spirit and scope of this invention, and where these materials are added a most desirable greenish color will still be obtained. Thus, it should be clear that a number of compounds may be added to the pigment composition of this invention for the purposes of lowering cost, slightly shifting the coloring one direction or another, arriving at a more pastel shade of certain of these colors, etc., without departing from the primary novel effect achieved by calcination of the three basic components of these pigments to provide their oxide equivalent within the critical percentage ranges set forth above.

Having thus described and illustrated my invention, it is set forth in the following claims which are to be construed in the light of the United States statutes and decisions in such a maner as to give them the broad range of equivalents to which they are entitled.

I claim:

1. The combination of a green calcined pigment composition and a work product colored thereby and having same dispersed throughout said work product, said pigment being the product of calcination, at a temperature of from between about 800° C. to about 1500° C., but below the fusion point thereof, of an intimate admixture of a silicon oxide yielding substance, an alkali metal oxide yielding substance, selected from the class $Li_2O$ and $Na_2O$, and a chromium oxide yielding substance, in relative amounts respectively, expressed as the oxide equivalents thereof, of from about 30 to 80 parts by weight $SiO_2$, from about 3 to 20 parts by weight alkali metal oxide, and about 15 to 60 parts by weight $Cr_2O_3$.

2. The work product of claim 1 wherein the silicon oxide yielding substance, the alkali metal oxide yielding substance, and the chromium oxide yielding substance are present in relative amounts respectively, expressed as the oxide equivalents thereof, of from about 35 to 75 parts by weight $SiO_2$, from about 3 to 15 parts by weight alkali metal oxide, and about 20 to 25 parts by weight $Cr_2O_3$, and said pigment composition is present in said work product in from about 1 to about 15 weight percent.

3. The combination of claim 1 wherein said alkali metal oxide yielding substance is a lithium compound in an $Li_2O$ equivalent of from about 3 to about 12% by weight.

4. The combination of claim 1 wherein said alkali metal oxide yielding substance is a sodium compound in a $Na_2O$ equivalent of from about 5 to about 15% by weight.

5. The combination of claim 1 wherein said work product is a paint.

6. The combination of claim 1 wherein said work product is an organic synthetic resin.

7. The combination of claim 2 wherein said work product is a paint.

8. The combination of claim 2 wherein said work product is an organic synthetic resin.

9. In a process for producing a work product colored with an inorganic green pigment dispersed therein, the steps of:
(a) intimately admixing substances capable of yielding respectively silicon oxide, alkali metal oxide selected from the class $Li_2O$ and $Na_2O$, and chromium oxide, in relative amounts respectively, expressed as the oxide equivalents thereof, of from about 30 to 80 parts by weight $SiO_2$, from about 3 to 20 parts by weight alkali metal oxide, and about 15 to 60 parts by weight $Cr_2O_3$,
(b) calcining said admixture at a temperature of from about 800° C. to about 1500° C., but below the fusion point thereof,
(c) pulverizing the calcined product of step (b) above into powder form,
(d) dispersing the product of step (c) in said work product in pigmenting amounts, and
(e) coloring said work product green with said pigments simultaneously with, and as a consequence of, step (d),
to produce a green pigmented work product.

10. In a process for producing a work product colored with an inorganic green pigment, the steps of:
(a) intimately admixing substances capable of yielding respectively silicon oxide, alkali metal oxide selected from the class $Li_2O$ and $Na_2O$, and chromium oxide, in a stoichiometric relationship represented by the formula $RCr(SiO_3)_2$ wherein R represents Na, Li and stoichiometric combinations of Na and Li,
(b) calcining said admixture at a temperature of from about 800° C. to about 1500° C., but below the fusion point thereof,
(c) pulverizing the calcined product of step (b) above into powder form,
(d) dispersing the product of step (c) in said work product in pigmenting amounts, and
(e) coloring said work product green with said pigment simultaneously with, and as a consequence of, step (d),
to produce a green pigmented work product.

11. As an article of manufacture, a green pigmented organic synthetic resin selected from the group consisting of polyethylene, polystyrene, polypropylene and polyester, said article pigmented with from about 1 to about 15 parts, per 100 parts resin, of a calcined, inorganic pigment having a composition represented by the formula $RCr(SiO_3)_2$ wherein R represents Na, Li and a stoichiometric combination of Na and Li.

12. As an article of manufacture, a green pigmented organic plastic resin selected from the group consisting of polyethylene, polystyrene, polypropylene and polyester, said article pigmented with from about 1 to about 15 parts, per 100 parts resin, of a calcined, inorganic pigment having a composition represented by the formula $RCr(SiO_3)_2$ wherein R represents Na, Li and a stoichiometric combination of Na and Li, said pigment having admixed therewith an extending agent.

13. The article of claim 12 wherein said extending agent is selected from the class consisting of $TiO_2$ and $CaCo_3$.

14. The work product of claim 1 wherein the silicon oxide yielding substance, the alkali metal oxide yielding substance, and the chromium oxide yielding substance are present in said pigment in relative amounts respectively, expressed as the oxide equivalents thereof, of from about 35 to 75 parts by weight $SiO_2$, from about 3 to 15 parts by weight alkali metal oxide, and about 20 to 25 parts by weight $Cr_2O_3$, and said pigment is present in from about 1 to about 15 parts by weight to 100 parts by weight of said work product.

15. The article of claim 12 wherein R is Li.

16. The work product of claim 14 wherein the alkali metal is Li.

17. In a process for producing a green powdered pigment, the steps of:
(a) intimately admixing precursors capable of yielding respectively silicon dioxide, an alkali metal oxide selected from the class $Li_2O$ and $Na_2O$, and chromic oxide, in relative amounts respectively, expressed as the oxide equivalents thereof, of from about 30 to 80 parts by weight $SiO_2$, from about 3 to 20 parts by weight alkali metal oxide, and from about 15 to 60 parts by weight $Cr_2O_3$,
(b) calcining said admixture at a temperature of from about 800° C. to about 1500° C., but below the fusion point of said admixture,
(c) pulverizing the calcined product of step (b) above into powder form,
to produce a green powdered pigment.

18. The process of claim 17 wherein the alkali metal oxide is $Li_2O$.

19. In a process for producing an inorganic green powdered pigment, the steps of:
(a) intimately admixing substances capable of yielding respectively silicon dioxide, $R_2O$ and chromic oxide, in a stoichiometric relationship represented by the formula $RCr(SiO_3)_2$ wherein R is Na, Li or a stoichiometric combination of Na and Li,
(b) calcining said admixture at a temperature of from about 800° C. to about 1500° C., but below the fusion point of said admixture,
(c) pulverizing the calcined product of step (b) above into powder form,
to produce a green powdered pigment.

20. The product of claim 17 having at least 10% greater reflectance, over the wave length range from about 520 to about 540 m$\mu$, than substantially pure $Cr_2O_3$ in a polyvinyl alcohol dispersion as described herein.

21. In a process for producing a green powdered pigment, the steps of:
(a) intimately admixing substances capable of yielding respectively silicon dioxide, alkali metal oxide selected from the class $Na_2O$ and $Li_2O$, and chromic oxide, in relative amounts respectively, expressed as the oxide equivalents thereof, of from about 35 to 75 parts by weight $SiO_2$, from about 3 to 15 parts by weight alkali metal oxide, and from about 20 to 25 parts by weight $Cr_2O_3$,
(b) calcining said admixture at a temperature of from about 800° C. to about 1500° C., but below the fusion point of said admixture,
(c) pulverizing the calcined product of step (b) above into powder form,
to produce a green powdered pigment.

22. The process of claim 21 wherein the alkali metal is Li.

23. The product of claim 21 having at least 10% greater reflectance, over the wave length range from about 520 to about 540 m$\mu$, than substantially pure $Cr_2O_3$ in a polyvinyl alcohol dispersion as described herein.

24. The process of claim 17 wherein said admixture is calcined at a temperature from about 1000° C. to about 1200° C., but below the fusion point of said admixture.

25. The product of claim 24 having at least 10% greater reflectance, over the wave length range from about 520 to about 540 m$\mu$, than substantially pure $Cr_2O_3$ in a polyvinyl alcohol dispersion as described herein.

References Cited

UNITED STATES PATENTS

| | | | |
|---|---|---|---|
| 2,387,528 | 10/1945 | Patterson et al. | 23—56 |
| 2,419,094 | 4/1947 | Sloan | 23—56 |
| 2,430,589 | 11/1947 | Sloan | 106—302 |
| 2,838,419 | 6/1958 | Francis | 106—302 |
| 2,941,861 | 6/1960 | Wentorf | 23—110 |
| 3,471,435 | 10/1969 | Miller | 260—41 A |

(Other references on following page)

UNITED STATES PATENTS

| | | | |
|---|---|---|---|
| 2,796,358 | 6/1957 | Foss | 106—302 |
| 3,002,846 | 10/1961 | Flasch | 106—302 |
| 3,072,495 | 1/1963 | Pitrot | 106—302 |
| 3,528,839 | 9/1970 | Weber | 106—302 |

OTHER REFERENCES

Mellor: "Comprehensive Treatise on Inorganic and Theoretical Chemistry," vol. 6, 1925 p. 914.

Kirk-Othmer, "Encyclopedia of Chemical Technology," vol. 5, 2nd ed. 1964, pp. 507–511.

Weyberg: Chemical Abstracts, vol. 2, pp. 3044–5, 1908.

B. N. Litvin: Chemical Abstracts, vol. 62, No. 15801c, 1965.

MORRIS LIEBMAN, Primary Examiner

P. R. MICHL, Assistant Examiner

U.S. Cl. X.R.

23—110 A; 106—97, 302; 260—37 N, 37 EP